(12) United States Patent
Faverolle et al.

(10) Patent No.: US 6,503,631 B1
(45) Date of Patent: Jan. 7, 2003

(54) OPHTHALMIC LENS MADE OF ORGANIC GLASS, COMPRISING AN ANTI-SHOCK PRIMER COAT

(75) Inventors: Francine Faverolle, Sturbridge, MA (US); Jean-Paul Cano, Chennevieres sur Mame; Georges Wajs, Ivry sur Seine, both of (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/697,817

(22) Filed: Oct. 26, 2000

Related U.S. Application Data

(63) Continuation of application No. PCT/FR00/00353, filed on Feb. 14, 2000.

(30) Foreign Application Priority Data

Feb. 26, 1999 (FR) ............................................. 99/02438

(51) Int. Cl.⁷ ............................ B32B 9/04; B32B 27/30; B05D 5/06; G02C 7/02
(52) U.S. Cl. ........................ 428/447; 428/523; 427/164; 427/165; 351/41
(58) Field of Search ................................. 427/164, 165, 427/166, 167, 168; 428/447, 523; 351/41

(56) References Cited

FOREIGN PATENT DOCUMENTS

| | | |
|---|---|---|
| EP | 0 609 756 | 8/1994 |
| EP | 0 842 991 | 5/1998 |
| JP | 07070255 | 3/1995 |
| JP | 10282306 | 10/1998 |
| WO | WO 94/25499 | 11/1994 |

*Primary Examiner*—Robert Dawson
*Assistant Examiner*—Michael J Feely
(74) *Attorney, Agent, or Firm*—Fulbright & Jaworski L.L.P.

(57) ABSTRACT

The ophthalmic lens according to the invention comprises a substrate made of organic glass, having front and rear main faces, at least one primer layer deposited on at least one of the main faces of the substrate, the said primer layer comprising an aggregate of at least two-phase particles, a first phase of which consists of a polymer P1 with a soft character having a glass transition temperature ($T_g$) of less than 20° C. and a second phase of which consists of a polymer P2 with a hard character having a glass transition temperature ($T_g$) of greater than 50° C., and at least one layer of an abrasion-resistant coating composition deposited on the primer layer. Application to lenses for spectacles.

20 Claims, No Drawings

OPHTHALMIC LENS MADE OF ORGANIC GLASS, COMPRISING AN ANTI-SHOCK PRIMER COAT

This application is a continuation of pending international application no. PCT/FR00/00353 filed Feb. 14, 2000, which is a continuation of French Application No. 99/02438 filed Feb. 26, 1999.

The invention relates, in a general way, to an ophthalmic lens made of organic glass, comprising, on at least one of its faces, an impact-resistant primer layer consisting of an aggregate of at least two-phase particles and in particular an aggregate of polymeric particles having a core/shell structure.

It is well known that ophthalmic lenses made of organic glass are more sensitive to scratching and to abrasion than lenses made of inorganic glass.

Consequently, it is common practice to protect the surface of lenses made of organic glass by means of a hard (abrasion-resistant) coating, in particular a polysiloxane-based coating.

Moreover, it is also known to treat lenses made of organic glass so as to prevent the formation of undesirable reflections which disturb both the wearer of the lens and his interlocutors. Thus, it is conventional to provide lenses made of organic glass with a monolayer or multilayer anti-reflection coating, generally made of inorganic material.

However, when the lens includes in its structure an abrasion-resistant hard coating and optionally an anti-reflection coating deposited on the surface of the abrasion-resistant hard coating, the presence of these coatings reduces the impact resistance of the final ophthalmic lens, by stiffening the system, which then becomes brittle.

To remedy this drawback, it has already been proposed to place an impact-resistant primer layer between the lens made of organic glass and the abrasion-resistant hard coating.

Thus, Japanese Patents 6314001 and 6387223 describe lenses made of organic glass which include an impact-resistant primer layer based on a thermoplastic polyurethane resin.

U.S. Pat. No. 5,015,523 recommends the use of acrylic impact-resistant primers, however European Patent EP-0,404,111 discloses the use of impact-resistant primers based on thermosetting polyurethane.

Document U.S. Pat. No. 5,316,791 discloses the use of an impact-resistant primer layer formed from an aqueous dispersion of polyurethane applied directly to a substrate surface made of organic glass. The impact-resistant primer layer may be obtained by drying and air-curing an aqueous dispersion or latex of a polyurethane which may optionally contain an anionically stabilized acrylic emulsion.

Although these impact-resistant primer layers of the prior art ensure both acceptable adhesion of the abrasion-resistant hard coating and appropriate impact resistance, they are not entirely satisfactory, particularly with regard to the minimum fracture energies.

It therefore remains desirable to develop novel impact-resistant primer coatings having improved impact-resistance performance and, in particular, improved average and minimum fracture energies.

It has now been discovered that it is possible to improve the impact resistance of ophthalmic lenses made of organic glass by using for the impact-resistant primer an aggregate of at least two-phase particles, one of the faces of which consists of a polymer having a soft character and another phase consists of a polymer having a hard character and having glass transition temperatures lying within predetermined ranges.

According to the invention, an ophthalmic lens having improved impact-resistance properties is obtained, which comprises a substrate made of organic glass, having front and rear main faces, at least one primer layer deposited on at least one of the main faces of the substrate, the primer layer comprising an aggregate of at least two-phase particles, a first phase of which consists of a polymer P1 with a soft character having a glass transition temperature ($T_g$) of less than 20° C. and a second phase of which consists of a polymer P2 with a hard character having a glass transition temperature ($T_g$) of greater than 50° C., and at least one layer of an abrasion-resistant coating composition deposited on the primer layer.

In the present description and the claims, the expression "at least two-phase particles" or "two-phase particles" will refer to an aggregate of particles comprising at least two separate particulate phases, these two particulate phases being optionally bonded together by one or more other particulate phases constituting one or more bonding interlayers.

Preferably, the two-phase organic particles have a core/shell structure, the core preferably consisting of polymer P1 and the shell of polymer P2.

Also preferably, polymer P1 is in the form of individualized nodules, dispersed in a matrix consisting of polymer P2, and polymer P1 has a greater hydrophobicity than polymer P2.

In general, the impact-resistant primer layer is a hydrophobic thermoplastic film, with no surface tack, consisting of 70 to 90% by weight of polymer P1 with a soft character and of 10 to 30% by weight of polymer P2 with a hard character.

Also preferably, polymer P1 has a $T_g$ of less than 0° C. and polymer P2 has a $T_g$ of greater than 60° C.

Polymers P1 and P2 of the primer layers according to the invention generally consist of:

90 to 100% by weight of units obtained by the polymerization of at least one monomer chosen from group (I) consisting of ($C_1$–$C_8$) alkyl esters of (meth)acrylic acid, such as methyl (meth)acrylate and butyl (meth)acrylate, vinyl esters of linear or branched carboxylic acids, such as vinyl acetate and vinyl stearate, styrene, alkylstyrenes, such as α-methylstyrene, haloalkylstyrenes, such as chloromethyl-styrene, conjugated dienes, such as butadiene and isoprene, (meth)acrylamide, acrylonitrile, vinyl chloride and (meth)acrylic acids and their derivatives, such as their anhydrides; and 0 to 10% by weight of units obtained by the polymerization of at least one monomer chosen from group (II) consisting of allyl esters of unsaturated α,β-dicarboxylic or monocarboxylic acids, such as allyl acrylate, allyl methacrylate and diallyl maleate, conjugated dienes, such as butadiene and isoprene, polyol poly(meth)acrylates, such as ethylene glycol dimethacrylate, 1,3-butylene glycol dimethacrylate, 1,4-butenediol diacrylate and pentaerythritol tetraacrylate, polyvinyl benzenes, such as divinyl benzene or trivinyl benzene, and polyallyl derivatives, such as triallyl cyanurate and triallyl trimesate.

The monomers of group (II) act as crosslinking agents in polymers P1 and P2.

In general, polymer P1 with a soft character consists mostly of units coming from the polymerization of at least one monomer chosen from butyl acrylate, butadiene and isoprene, whereas polymer P2 with a hard character generally consists mostly of units coming from the polymerization of at least one monomer chosen from methyl methacrylate, styrene and vinyl chloride.

In the case of a core/shell structure, preferably only the core is crosslinked, the preferred crosslinking monomers being butadiene and 1,4-butanediol diacrylate, and the content of crosslinking monomers being between 0 and 10% by weight with respect to the total weight of the particles.

The hard polymer P2 may be grafted directly onto polymer P1 or by introducing residues of monomer units onto P1. These residues of monomer units are obtained by the incorporation, into soft polymer P1, of grafting monomers chosen either from conjugated dienes, the residues of monomer units resulting from the partial incorporation into the 1,2 position of the diene during the polymerization, or from allyl esters of unsaturated α,β-dicarboxylic or carboxylic acids, which possess two copolymerizable functional groups of different reactivities.

The preferred grafting monomers according to the invention are butadiene, allyl methacrylate and diallyl maleate.

Polymers P1 and P2 according to the invention may be prepared by two-step emulsion polymerization, as described below, using monomers chosen from group (I) and possibly group (II) mentioned above.

The selection of the monomers, both for soft polymer P1 and hard polymer P2, depends on properties, such as the hydrophobicity and the glass transition temperature, that it is desired to give to the polymers in question.

The primer layer according to the invention may in particular be obtained from a latex containing particles of polymers P1 and P2, particularly core/shell-structured, hydrophobic polymers P1 and P2. When the contribution by mass of the shell in the total weight of the polymer particles does not exceed 30%, the latex applied to one surface of a substrate made of organic glass gives, after drying at low temperature and without the use either of coalescants or of volatile organic compounds, a continuous film structured in the form of soft nodules dispersed in a homogeneous hard matrix, having no surface tack and having good mechanical integrity.

In general, hydrophobicity is the non-solubility in water or the lack of affinity with respect to water. According to the invention, this lack of affinity may be hierarchized. This is because the hydrophobicity according to the invention is defined by the solubility parameter ($\Delta$) as described in "Properties of polymers" by D. W. Van Krevelen, 1990, 3rd edition, page 220. This parameter makes it possible to classify various polymers according to their affinities with respect to water. According to the invention, a polymer is hydrophobic if its ($\Delta$) is less than 26. In addition, if ($\Delta 1$) of a polymer 1 is less than ($\Delta 2$) of a polymer 2, then 1 is more hydrophobic than 2.

A suitable latex for the production of the primer layers according to the invention is a latex which contains neither coalescants nor volatile organic compounds and forms a film by evaporation at a temperature of less than 40° C. and preferably close to 25° C., the said latex being based on particles of hydrophobic polymers having a core/shell structure, consisting of:

70 to 90% by weight of at least one polymer P1 with a soft character having a $T_g$ of less than 20° C., forming the core, and;

10 to 30% by weight of at least one polymer P2 with a hard character having a $T_g$ of greater than 50° C., forming the shell.

The particles of the latices of the invention have preferably particle sizes ranging from 30 to 400 nm and more preferably from 50 to 250 nm.

A preferred latex according to the invention is a latex having a core/shell structure which is not cross-linked to core and which is functionalized with (meth)acrylic function (preferably methacrylic functions) within the shell.

Preferably, the core has a $T_g$ of less than 0° C. and the shell has a $T_g$ of greater than 60° C. In addition, and in the context of the invention, the core is more hydrophobic than the shell.

The latices of the invention are prepared in two steps, by the emulsion polymerization of a monomer mixture consisting of:

90% to 100% by weight of at least one monomer chosen from group (I), and

0% to 10% by weight of at least one monomer chosen from group (II).

Generally, the latices of the invention are prepared by emulsion polymerization in at least two steps using the polymerization techniques well known to those skilled in the art.

The composition of the monomer mixture to be polymerized at each step depends on the character that it is desired to give to the polymer formed in this step ($T_g$ and hydrophobicity).

According to the invention, the polymer P1 with a soft character and with a $T_g$ of less than 20° C., constituting the core of the particles, is prepared in a first step and then the polymer P2 with a $T_g$ of greater than 50° C., constituting the shell with a hard character, is prepared.

It should be noted that, in order for the particles to be perfectly structured, the monomer mixture to be polymerized in order to form the core must be more hydrophobic than that to be polymerized in order to form the shell.

For each step, the polymerization reaction is preferably carried out in an inert atmosphere in the presence of radical initiators. The initiation system used may be an oxidation-reduction system or a thermal or peroxide system, such as tert-butyl hydroperoxide/sodium bisulphate or diisopropyl benzene, the amounts used being between 0.2 and 1% by weight with respect to the total mass of the monomers, preferably between 0.25 and 0.5% by weight.

The emulsion polymerization reaction according to the invention is carried out at a temperature of between 25 and 150° C. and depends on the nature of the initiation system used.

The dispersions according to the invention are preferably prepared using a process of the semicontinuous type, making it possible to limit the compositional derivatives which depend on the differences in reactivity of the various monomers. The monomers, which are either pure or in the form of a pre-emulsion with some of the water and surfactants, is thus generally introduced over a time period ranging from 3 hours 30 minutes to 5 hours. It is also useful, although not absolutely essential, to employ seeding of 1 to 15% of the monomers. The emulsifying systems used in the emulsion polymerization process according to the invention are chosen from the range of emulsifiers having a suitable hydrophilic/lipophilic balance. The preferred systems consist of the combination of an anionic surfactant, such as sodium lauryl sulphate, ethoxylated nonylphenol sulphates, particularly those containing 20–25 mol of ethylene oxide, benzenedodecanesulphonate and ethoxylated fatty alcohol sulphates, and of a nonionic surfactant, such as ethoxylated nonylphenols, particularly those containing 10–40 mol of ethylene oxide, and ethoxylated fatty alcohols.

The substrates suitable for the lenses according to the present invention are any of the substrates made of organic glass which are commonly used for organic ophthalmic lenses.

Among the substrates suitable for the lenses according to the invention, mention may be made of substrates obtained by polymerization of alkyl (meth) acrylates, particularly $C_1$–$C_4$ alkyl (meth) acrylates such as methyl (meth)acrylate and ethyl (meth)acrylate, allyl derivatives such as linear or branched, aliphatic or aromatic polyol allyl carbonates, thio(meth)acrylics, thiourethanes and polyethoxylated aromatic (meth)acrylates such as polyethoxylated bisphenol A dimethacrylates and polycarbonates (PC).

Among the recommended substrates, mention may be made of substrates obtained by the polymerization of polyol allyl carbonates, among which may be mentioned ethylene glycol bis(allyl carbonate), diethylene glycol bis(2-methyl carbonate), diethylene glycol bis(allyl carbonate), ethylene glycol bis(2-chloroallyl carbonate), triethylene glycol bis (allyl carbonate), 1,3-propanediol bis(allyl carbonate), propylene glycol bis(2-ethylallyl carbonate), 1,3-butenediol bis (allyl carbonate), 1,4-butenediol bis(2-bromoallyl carbonate), dipropylene glycol bis(allyl carbonate), trimethylene glycol bis(2-ethyl allyl carbonate), pentamethylene glycol bis(allyl carbonate) and isopropylene bisphenol A bis(allyl carbonate).

The substrates particularly recommended are the substrates obtained by the polymerization of diethylene glycol bis(allyl carbonate) sold under the brand-name CR 39® by PPG Industrie (ORMAE lens from Essilor).

Among the substrates also recommended, mention may be made of the substrates obtained by the polymerization of thio(meth)acrylic monomers such as those described in French Patent Application FR-A-2,734,827.

Of course, the substrates may be obtained by the polymerization of mixtures of the above monomers.

For ophthalmic lenses made of a thermoplastic polycarbonate material (PC), these lenses already being highly impact-resistant, the primers according to the invention may advantageously be used as adhesion primers.

The abrasion-resistant hard coatings of the ophthalmic lenses according to the invention may be any abrasion-resistant coating known in the field of ophthalmic optics.

Among the abrasion-resistant hard coatings recommended in the present invention, mention may be made of coatings obtained from compositions based on a silane hydrolysate, particularly an epoxysilane hydrolysate, such as those described in French Patent Application No. 93/02649 and in U.S. Pat. No. 4,211,823.

A preferred abrasion-resistant hard coating composition comprises, with respect to the total weight of the composition, approximately 22% of glycidoxypropylmethyldimethoxysilane, 62% of colloidal silica with a solids content of 30% and 0.7% of aluminium acetylacetonate (a catalyst), the balance essentially consisting of the solvents conventionally used for fomulating such compositions.

Preferably, the hydrolysate used is a hydrolysate of γ-glycidoxypropyltrimethoxysilane (GLYMO) and of dimethyldiethoxysilane (DMDES).

As indicated above, the ophthalmic lens according to the invention may furthermore include an anti-reflection coating deposited on the abrasion-resistant coating.

By way of example, the anti-reflection coating may consist of a monolayer or multilayer film of dielectric materials such as $SiO$, $SiO_2$, $Si_3N_4$. $TiO_2$, $ZrO_2$, $Al_2O$, $MgF2$ or $Ta_2O_5$ or their mixtures.

In this way, it becomes possible to prevent the appearance of a reflection at the lens/air interface.

This anti-reflection coating is generally applied by vacuum deposition using one of the following techniques:

1. by evaporation, possibly assisted by an ion beam;
2. by ion beam sputtering;
3. by cathodic sputtering;
4. by plasma-enhanced chemical vapour deposition.

Apart from vacuum deposition, it is also conceivable for an inorganic layer to be deposited by the sol-gel route (for example, using tetraethoxysilane hydrolysates).

If the film comprises a single layer, its optical thickness must be equal to $\lambda/4$ where $\lambda$ is a wavelength lying between 450 and 650 nm.

In the case of a multilayer film comprising three layers, a combination corresponding to respective optical thicknesses of $\lambda/4$-$\lambda/2$-$\lambda/4$ or $\lambda/4$/-$\lambda/4$-$\lambda/4$ may be used.

It is also possible to use an equivalent film formed by more layers, instead of any of the layers forming part of the three aforementioned layers.

The ophthalmic lenses according to the invention may consist of an organic glass substrate coated on its rear face or its front face with an impact-resistant primer interlayer according to the invention, with an abrasion-resistant coating deposited on the primer layer and optionally with an anti-reflection coating on the abrasion-resistant coating.

The substrate may also be coated on both faces with an impact-resistant primer layer according to the invention, with an abrasion-resistant coating and optionally with an anti-reflection coating.

The preferred ophthalmic lenses according to the invention have a single impact-resistant primer layer deposited on the rear face of the lens and, on each of the faces, an abrasion-resistant coating and an anti-reflection coating applied to the abrasion-resistant coating.

For example, it is possible to obtain a lens according to the invention by depositing a layer of a latex composition, as defined above, on the rear face of the lens and leaving this latex to dry at room temperature or at a temperature close to room temperature in order to form the impact-resistant primer layer. Next, the abrasion-resistant hard coating is applied to both faces of the lens by dip coating. Finally, after this hard coating has cured, an anti-reflection coating may be applied to one or both faces of the lens.

An ophthalmic lens obtained in this way exhibits excellent abrasion resistance on its front face, this being more exposed to stresses when the user is handling his spectacles, and excellent impact resistance.

In general, the thickness of the impact-resistant primer layer according to the invention is between 0.1 and 10 μm, preferably between 0.2 and 3.5 μm and even better between 0.5 and 2 μm.

As regards the thickness of the abrasion-resistant coating, this is generally between 1 and 10 μm and more particularly between 2 and 6 μm.

The following examples illustrate the present invention.

In the examples, unless otherwise indicated all percentages and parts are expressed by weight.

EXAMPLE OF THE PREPARATION OF LATICES ACCORDING TO THE INVENTION

Preparation of a Latex A

The preparation is carried out in a 5-litre reactor, fitted with a stirrer and a temperature probe, the reactor having a jacket within which a heat-transfer fluid circulates in order to maintain the temperature of the reactor.

Introduced into this reactor, flushed out beforehand with nitrogen, maintained at room temperature and with stirring, are 1500 g of demineralized water and 4.8 g of disodium hydrogen phosphate, and then 40.05 g of sodium lauryl sulphate as emulsifier are dissolved in this mixture.

Next, the temperature of the contents of the reactor are heated to 57° C. and, while maintaining this temperature, 991.75 g of n-butyl acrylate and 9.2 g of 1,4-butanediol diacrylate are then added simultaneously to the said contents.

The temperature of the reactor is raised to 66° C. and 1.3 g of potassium persulphate dissolved in 12.5 g of water and 0.925 g of sodium bisulphite dissolved in 35 g of water are added to the reaction mixture.

After an induction time of about 15 minutes, the temperature rises to 107° C.

After this exotherm, a mixture consisting of 98.9 g of n-butyl acrylate and 5.48 g of diallyl maleate is added to the reactor maintained at 80° C., followed by 0.15 g of potassium persulphate dissolved in 25 g of water. The temperature is maintained at 80° C. for one hour. The elastomeric core, consisting of latex particles having a Coulter diameter of 77 mm, is obtained with a 97% conversion.

Added to the reaction mixture obtained above, maintained at 80° C., with stirring, is 1 g of sodium sulphoxylate formaldehyde in 5 g of water. Next, 279.9 g of methyl methacrylate and, moreover, 0.825 g of diisopropyl benzene hydroperoxide in 275 g of water are added over a period of 1 hour.

The contents of the reactor are maintained at 80° C. for 1.5 hours after the start of the methyl methacrylate addition, and 0.5 g of tert-butyl hydroperoxide and 0.175 g of sodium bisulphite in 10 g of water are added to the said contents.

Next, the reaction mixture is maintained at 80° C. for 1 hour. After this period, the contents of the reactor are cooled to room temperature.

A latex of the grafted copolymer, the average particle diameter of which is 85 mm and the solids content of which is 39.9%, is obtained with a 96.4% conversion. Analysis of the polymer obtained shows that it has two $T_g$s, one located at −38° C. and the other at 105° C.

Preparation of a Latex B

The procedure is the same as previously, except that the composition of the monomers to be polymerized at each step is modified so as to modify the $T_g$s of the copolymers prepared.

The characteristics of the particles of latex B are as follows:

Latex B:
Average particle diameter: 90 nm
$T_g 1$: −49° C.
$T_g 2$: 100° C.

Preparation of a 70/30 BuA/MMA Latex

A butyl acrylate (BuA)/methyl methacrylate (MMA) latex is prepared in the following way:

Preparation of the Stock

Dissolved in 148.9 g of water are 0.82 g of the surfactant DISPONIL® 3065 (a mixture of 30 EO fatty alcohols with 65% active substances) and 0.55 g of the surfactant DISPONIL® FES ($C_{12-14}(OCH_2CH_2)_{12} OSO^-_3Na^+$). The mixture is stirred for 10 minutes and then introduced into a jacketed reactor, the cover of which has 5 inlets (for nitrogen, the thermometer, the stirrer, the inflow of the initiator and the inflow of the pre-emulsion). The reactor is degassed for 1 hour.

Preparation of the Initiating Solution

In parallel, 1.6 g of sodium persulphate are dissolved in 12.4 g of water.

Preparation of a 70/30 BuA/MMA Core/shell Structure Latex

Firstly, the core of the latex was prepared by pouring in the pre-emulsion I over 2 hours 48 minutes, and secondly, the shell was prepared by pouring in the pre-emulsion II over 1 hour 12 minutes.

The initiating solution is introduced, concomitantly with the addition of the pre-emulsions I and II, over 4 hours.

The compositions of the stock, of the pre-emulsions I and II and of the initiating solution are given in the table below:

|  | Stock | Pre-emulsion I | Pre-emulsion II | Initiating solution |
|---|---|---|---|---|
| Water (g) | 148.9 | 115.4 | 49.4 | 12.4 |
| DISPONIL 3065 (g) (2% weight/M) | 0.82 | 5.15 | 2.21 | |
| DISPONIL FES (g) (2%) | 0.55 | 3.36 | 1.44 | |
| NaHCO₃ (g) | | 0.4 | 0.17 | |
| BUA (g) | | 185.7 | | |
| MMA (g) | | | 79.6 | |
| Sodium persulphate (g) | | | | 1.6 |

The product obtained is a 70/30 BuA/MMA latex having the following characteristics:

| Solids content (%) | Particle size (nm) |
|---|---|
| 44 | 210 |

EXAMPLES OF LENS CONSTRUCTION WITH A PRIMER LAYER ACCORDING TO THE INVENTION

The latices given in the table below were used to form the impact-resistant primer layers of the ophthalmic lenses of the following examples. The crosslinking agent involved below is that for crosslinking the core (BuA) of the particles.

In following example 4, MAA is included with the shell of the particles.

| Latex | Composition | Solids content (%) |
|---|---|---|
| 1 (comparative) | 60/40 PU(PES)/Acry | 39 |
| 2 | 80/20 BuA/MMA (crosslinking agent: 0.9% BDA) | 39 |
| 3 | 80/20 BuA/MMA (crosslinking agent: 0.3% BDA) | 39 |
| 4 | 80/20 BuA/MMA (crosslinking agents: 0.9% BDA) shell (1.1% MAA) | 39 |
| 5 | 80/20 BuA/MMA (crosslinking agent: 0.15% BDA) | — |
| 6 | 80/20 BuA/MMA (no crosslinking agent) | — |
| 7 | 70/30 BuA/MMA (no crosslinking agent) | 37 |

PU(PES): Polyurethane latex with aliphatic polyester units, NEOREZ® R 965 from Zeneca Acry: Latex A 639 (acrylic/styrene) from Zeneca BuA: Butyl acrylate MMA: Methyl methacrylate BDA: Butyl diacrylate MAA: Methacrylic acid (latices 2 to 7 are latices according to the invention.

The rear face of substrates made of organic glass were coated with a layer of one of the primers according to the invention and with primers of the prior art, as indicated in the table below.

The characteristics of the lenses obtained are also given in the table.

The lenses all also had, on the primer layer, an identical abrasion-resistant coating layer and an identical layer of an anti-reflection coating.

| Lens No. | Substrate made of organic glass | Prime layer Latex No. | Thickness ($\mu$m) |
|---|---|---|---|
| 1 (comparative) | A | 1 | 1 |
| 2 | A | 2 | 1 |
| 3 | A | 2 | 3 |
| 4 | A | 3 | 1 |
| 5 | A | 3 | 3 |
| 6 | A | 4 | 3 |
| 7 | A | 7 | 1 |
| 8 (comparative) | B | 1 | 1 |
| 9 (comparative) | B | 1 | 3 |
| 10 | B | 3 | 1 |
| 11 | B | 3 | 3 |
| 12 | A | 5 | 1 |
| 13 | A | 6 | 1 |

Substrate A: ORMA® made of CR 39® from Essilor.
  Power: −2 diopters
  Thickness at the centre: 2 mm.
Substrate B: ORMEX® from Essilor.
  Power: −2 diopters
  Thickness at the centre: 1.1 mm.
Abrasion-resistant coating:

The abrasion-resistant coating composition is obtained in the following way:

Introduced drop by drop into a solution containing 224 parts of GLYMO and 120 parts by weight of DMDES are 80.5 parts of 0.1 M hydrochloric acid.

The hydrolyzed solution is stirred for 24 hours at room temperature and then 718 parts by weight of 30% colloidal silica in methanol, 15 parts by weight of aluminium of acetylacetonate and 44 parts by weight of ethyl cellosolve are added.

At the end, a small amount of surfactant is added.

The lens coated with the primer on the rear face is dipped into a bath containing the coating composition and then, after removing it from the bath, the lens is heated at 90° C. for 1 hour.

The thickness of the abrasion-resistant coating, after curing, is 3 $\mu$m.

Anti-reflection Coating:

The anti-reflection coating is applied to both faces of the lens (on the abrasion-resistant coating) by vacuum deposition of the following successive layers:

| | Material | Optical thickness |
|---|---|---|
| First deposited layer: | $ZrO_2$ | 55 nm |
| Second deposited layer: | $SiO_2$ | 30 nm |
| Third deposited layer: | $ZrO_2$ | 160 nm |
| Fourth deposited layer: (upper layer) | $SiO_2$ | 120 nm |

The optical thicknesses are given for $\lambda$=550 nm.

The fracture energy of the lenses was measured in accordance with the FDA standard for the impact resistance of ophthalmic glasses. This test consists in dropping a 16 g ball from a height of 127 cm onto the centre of the convex face of the lens, representing an energy of 200 mJ. The glass conforms to the standard if breaks nor forms a star.

In order to measure the fracture energy of the ophthalmic lenses, balls are dropped with increasing energy onto the centre of the lenses until starring or fracture of the latter occurs. The fracture energy of the lens is then calculated.

For each lens, these tests were carried out on a series of 20 lenses and thus an average fracture energy and the minimum fracture energy, corresponding to the lowest energy causing star formation or fracture of one of the lenses of the series, were determined.

The latter energy is important since, to pass the FDA test, all the lenses of a series must have a minimum fracture energy of at least 200 mJ.

The results are given in the table below.

| Lens No. | Average fracture energy (mJ) | Minimum fracture energy (mJ) | Standard deviation |
|---|---|---|---|
| Bare substrate A | 1800 | 450 | 600 |
| Bare substrate B | 800 | 100 | — |
| Substrate A coated only with the abrasion-resistant layer | 560 | 300 | 140 |
| Substrate A coated with the abrasion-resistant layer and the anti-reflection layer | 180 | 160 | 15 |
| Substrate B coated only with the abrasion-resistant layer | 230 | 130 | 35 |
| Substrate B coated with the abrasion-resistant layer and the anti-reflection layer | 200 | — | — |
| 1 (comparative) | 555 | — | 115 |
| 2 | 1270 | 810 | 345 |
| 3 | 1550 | 1100 | 280 |
| 4 | 1520 | 1065 | 260 |
| 5 | 1720 | 1380 | 280 |
| 6 | 1560 | 1210 | 220 |
| 7 | 1450 | 835 | 445 |
| 8 (comparative) | 350 | 168 | 138 |
| 9 (comparative) | 2140 | 169 | 1100 |
| 10 | 1210 | 470 | 650 |
| 11 | 1745 | 330 | 715 |
| 12 | 2052 | 632 | 984 |
| 13 | 2470 | 1120 | 832 |

The results show that:

1/the presence of the abrasion-resistant and anti-reflection coatings considerably reduces the impact resistance of the substrates made of organic glass;

2/the use of an impact-resistant primer layer according to the invention appreciably improves the impact resistance compared with a PU(PES)/Acry impact-resistant primer of the prior art.

In particular, in the lenses according to the invention, not only is the average energy guaranteed but the minimum energy is always substantially greater than 200 mJ, something which is not the case for lenses having a PU(PES)/Acry primer layer.

Furthermore, the scatter in the results is also less.

Finally, it may be seen that the impact behaviour improves when the crosslinking of the core decreases.

What is claimed is:

1. An ophthalmic lens comprising:
   a substrate made of organic glass, the substrate comprising front and rear main faces;
   at least one primer layer deposited on at least one of the main faces of the substrate, the primer layer comprising an aggregate of at least two-phase particles, the aggregate further defined as comprising a first phase which consists of a polymer P1 having a glass transition temperature ($T_g$) of less than 20° C. and a second phase which consists of a polymer P2 having a glass transition temperature ($T_g$) of greater than 50° C., and
   at least one layer of an abrasion-resistant coating composition deposited on the primer layer.

2. The ophthalmic lens of claim 1, wherein the polymer P1 is further defined as having a soft character.

3. The ophthalmic lens of claim 1, wherein the polymer P2 is further defined as having a hard character.

4. The ophthalmic lens of claim 1, wherein the two-phase organic particles have a core/shell structure.

5. The ophthalmic lens of claim 4, wherein the core comprises polymer P1 and the shell comprises polymer P2.

6. The ophthalmic lens of claim 1, wherein the polymer P1 forms 70 to 90% by weight of the primer layer and polymer P2 forms 10 to 30% by weight of the primer layer.

7. The ophthalmic lens of claim 1, wherein the polymer P1 is dispersed in nodules in a matrix comprising polymer P2.

8. The ophthalmic lens of claim 1, wherein the polymer P1 has a greater hydrophobicity than polymer P2.

9. The ophthalmic lens of claim 1, wherein polymers P1 and P2 comprise:
   from 90% to 100% by weight of units obtained by the polymerization of at least one monomer chosen from group (I) consisting of ($C_1$–$C_8$) alkyl esters of (meth)acrylic acid, vinyl esters of linear or branched carboxylic acids, styrene, alkylstyrenes, haloalkylstyrenes, conjugated dienes, (meth)acrylamide, acrylonitrile, vinyl chloride, (meth)acrylic acids and their derivatives; and
   from 0% to 10% by weight of units obtained by the polymerization of at least one monomer chosen from group (II) consisting of allyl esters of unsaturated α,β-dicarboxylic or monocarboxylic acids, conjugated dienes, polyol poly(meth)acrylates, polyvinyl benzenes and polyallyl derivatives.

10. The ophthalmic lens of claim 9, wherein:
    for polymer P1, the monomers are chosen, in the case of the monomers of group (I), from ethyl acrylate, butyl acrylate, butadiene, butyl methacrylate and methyl methacrylate and, in the case of the monomers of group (II), from 1,4-butenedioldiacrylate, butadiene, ethylene glycol diacrylate, diallyl maleate and allyl methacrylate; and
    for polymer P2, the monomers are chosen exclusively from the monomers of group (I), comprising methyl methacrylate, butyl methacrylate and methacrylic acid.

11. The ophthalmic lens of claim 1, wherein the polymer P1 has a $T_g$ of less than 0° C. and polymer P2 has a $T_g$ of greater than 60° C.

12. The ophthalmic lens of claim 1, wherein the lens comprises a single primer layer on the rear main face of the substrate.

13. The ophthalmic lens of claim 1, wherein the lens comprises a primer layer on each of the main faces of the substrate.

14. The ophthalmic lens of claim 1, wherein the lens further comprises an anti-reflection coating on the abrasion resistant coating.

15. The ophthalmic lens of claim 1, wherein that the abrasion-resistant coating is a polysiloxane coating.

16. The ophthalmic lens of claim 15, wherein that the polysiloxane is obtained by curing a hydrolysate of silanes containing an epoxysilane.

17. The ophthalmic lens of claim 16, wherein the hydrolysate contains silica particles.

18. An ophthalmic lens comprising:
    a substrate made of organic glass, the substrate comprising front and rear main faces;
    at least one primer layer deposited on at least one of the main faces of the substrate, the primer layer further defined as comprising a hydrophobic thermoplastic film having substantially no surface tack which film comprises 70 to 90% by weight of a polymer P1, polymer P1 defined as having a soft character and a glass transition temperature ($T_g$) of less than 20° C., dispersed in 10 to 30% by weight of a polymer P2, polymer P2 defined as having a soft character and a glass transition temperature ($T_g$) of greater than 50° C., wherein polymer P1 is dispersed in the form of nodules in a matrix comprised of polymer P2; and
    at least one layer of an abrasion-resistant coating composition deposited on the primer layer.

19. The ophthalmic lens of claim 18, wherein polymer P1 is more hydrophobic than polymer P2.

20. A method of making an ophthalmic lens comprising:
    obtaining a substrate made of organic glass, the substrate comprising front and rear main faces;
    depositing at least one primer layer at least one of the main faces of the substrate, the primer layer comprising an aggregate of at least two-phase particles, the aggregate further defined as comprising a first phase which consists of a polymer P1 having a glass transition temperature ($T_g$) of less than 20° C. and a second phase which consists of a polymer P2 having a glass transition temperature ($T_g$) of greater than 50° C., and
    depositing at least one layer of an abrasion-resistant coating composition on the primer layer.

* * * * *

UNITED STATES PATENT AND TRADEMARK OFFICE
CERTIFICATE OF CORRECTION

PATENT NO. : 6,503,631 B1  
DATED : January 7, 2003  
INVENTOR(S) : Faverolle et al.

It is certified that error appears in the above-identified patent and that said Letters Patent is hereby corrected as shown below:

<u>Title page,</u>  
Item [57], ABSTRACT,  
Lines 8 and 9, please delete "C." and insert -- C -- therefor.

<u>Column 11,</u>  
Lines 10 and 12, please delete "C." and insert -- C -- therefor.

<u>Column 12,</u>  
Lines 2, 32 and 35, please delete "C." and insert -- C -- therefor.

Signed and Sealed this

Eleventh Day of March, 2003

JAMES E. ROGAN  
*Director of the United States Patent and Trademark Office*